(12) United States Patent
Hoashi (10) Patent No.: US 7,245,359 B1
(45) Date of Patent: Jul. 17, 2007

(54) VEHICULAR RADAR SYSTEM

(75) Inventor: Yoshiaki Hoashi, Kariya (JP)

(73) Assignee: DENSO Corporation, Kariya (JP)

( * ) Notice: Subject to any disclaimer, the term of this patent is extended or adjusted under 35 U.S.C. 154(b) by 107 days.

(21) Appl. No.: 11/237,115

(22) Filed: Sep. 28, 2005

(30) Foreign Application Priority Data

Oct. 1, 2004 (JP) ............................. 2004-290482

(51) Int. Cl.
*G01C 3/08* (2006.01)

(52) U.S. Cl. ..................................... 356/5.01; 356/4.01

(58) Field of Classification Search .............. 356/4.01, 356/4.07, 5.01, 5.1, 28; 342/70–72
See application file for complete search history.

(56) References Cited

U.S. PATENT DOCUMENTS

| | | | | |
|---|---|---|---|---|
| 3,417,393 A | * | 12/1968 | Cooke et al. ............... | 342/157 |
| 4,580,894 A | * | 4/1986 | Wojcik ....................... | 356/28 |
| 5,565,870 A | * | 10/1996 | Fukuhara et al. ........... | 342/70 |
| 6,204,755 B1 | * | 3/2001 | Kikuchi ...................... | 340/435 |
| 6,307,622 B1 | * | 10/2001 | Lewis ........................ | 356/4.01 |
| 6,759,983 B2 | * | 7/2004 | Eden .......................... | 342/451 |
| 2003/0085834 A1 | * | 5/2003 | Okamura .................... | 342/70 |
| 2004/0169840 A1 | | 9/2004 | Hoashi et al. | |
| 2006/0022866 A1 | * | 2/2006 | Walton et al. .............. | 342/194 |

\* cited by examiner

*Primary Examiner*—Thomas H. Tarcza
*Assistant Examiner*—Isam Alsomiri
(74) *Attorney, Agent, or Firm*—Harness, Dickey & Pierce, PLC (57) ABSTRACT

A radar system of a vehicle has a zero-cross comparator, an integrator, and a sensor. The comparator compares a light reception signal output from each one of photoreceptive elements with a predetermined standard signal and outputs a comparison signal indicating two different states corresponding to a result of the comparison. The integrator samples the comparison signal and converts the comparison signal into one-bit digital data. The integrator integrates the digital data for each photoreceptive element. The sensor compares the integrated data of each photoreceptive element with a predetermined integration standard value. The sensor senses a reflection object based on the integrated data equal to or greater than the integration standard value.

8 Claims, 7 Drawing Sheets

| NOISE TYPE | NOISE ORIGIN | WAVEFORM EXAMPLE |
|---|---|---|
| BACKGROUND NOISE | · THERMAL NOISE<br>· SHOT NOISE<br>(=RANDOM NOISES) | NORMAL DISTRIBUTION |
| BASE NOISE | · LARGE CURRENT AT LIGHT EMISSION<br>· CLOCK NOISE<br>· POWER SOURCE NOISE | |

VEHICULAR RADAR SYSTEM

CROSS REFERENCE TO RELATED APPLICATION

This application is based on and incorporates herein by reference Japanese Patent Application No. 2004-290482 filed on Oct. 1, 2004.

BACKGROUND OF THE INVENTION

1. Field of the Invention

The present invention relates to a vehicular radar device.

2. Description of Related Art

JP-A-2004-177350 describes a vehicular radar system having a light emitter for emitting a laser light and a photoreceptor for receiving a reflected light of the laser light. The vehicular radar system is attempting to improve detection sensitivity of the reflected light reflected by a reflection object.

The light emitter of the vehicular radar system generates the laser light with a laser diode and changes an emission direction of the laser light with a polygon mirror that is driven to rotate. Thus, the light emitter performs scanning over a predetermined angular range for each predetermined minute angle with the laser light. If the laser light is reflected by the reflection object, the photoreceptor receives the reflected light with a light receiving lens. The received light is introduced to photoreceptive elements. The photoreceptive elements output voltage signals corresponding to intensity of the received light.

The vehicular radar system integrates a predetermined number of light reception signals, which are output based on a predetermined number of laser lights emitted contiguously, and outputs an integration signal, while ensuring angular resolution of the laser light. Thus, a light reception signal component corresponding to the reflected light is amplified by integrating the predetermined number of the light reception signals, and detection sensitivity of the reflected light can be improved.

Another vehicular radar system has a light emitter for emitting a laser light over a predetermined angular range in one emission and a photoreceptor having photoreceptive elements of the number corresponding to necessary angular resolution. The photoreceptive elements are arranged into an array along a width direction of the vehicle. This vehicular radar system integrates light reception signals, which are output when the photoreceptive element repeatedly receives the light, for each photoreceptive element. Thus, this vehicular radar system attempts to improve the detection sensitivity of the reflected light.

Figure 11A:
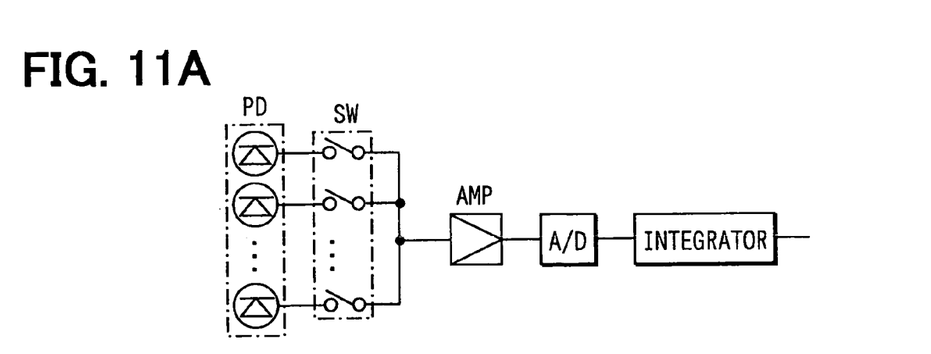
FIG. 11A is a schematic diagram showing a photo IC of a related art.

In such a case where the photoreceptor has multiple photoreceptive elements, usually, a structure shown in FIG. 11A having an integrator that integrates the light reception signals output by the photoreceptor is used.

The structure shown in FIG. 11A includes an amplification circuit (AMP), an A/D conversion circuit (A/D), an integrator, and switches (SW). The amplification circuit AMP amplifies the light reception signals output by the photoreceptive elements (PD) such as photo diodes. The A/D conversion circuit A/D converts the analog light reception signals into digital signals. The integrator integrates the digital light reception signals. The switch SW switches the output of the light reception signal output by each photoreceptive element PD. The amplification circuit AMP, the A/D conversion circuit A/D and the integrator are commonly used for the respective photoreceptive elements PD and switches SW.

The integration of the light reception signals is performed by switching each photoreceptive element PD. Therefore, the integration of the light reception signals output from the respective photoreceptive elements PD cannot be processed at the same time (in parallel). In such a case, the laser light needs to be emitted repeatedly for the time corresponding to the product of the number of the photoreceptive elements PD and the time of the integration. The laser diode will be degraded sooner as the time number of laser light emission increases.

Figure 11B:
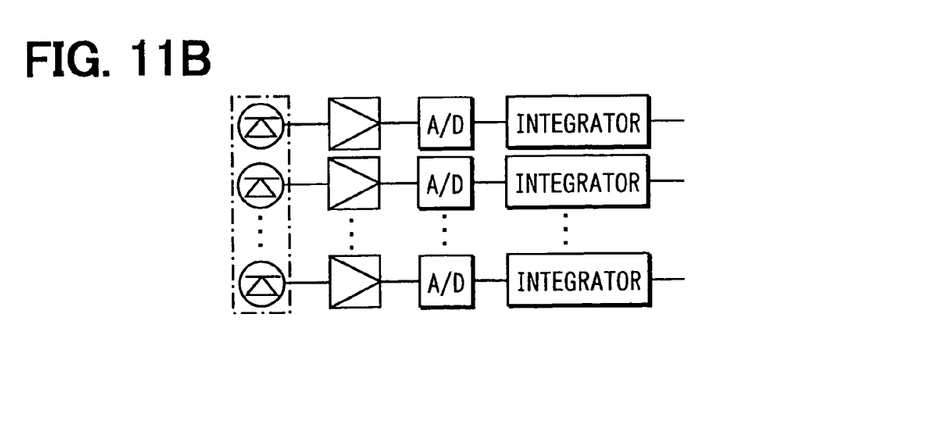
FIG. 11B is a schematic diagram showing a photo IC of another related art.

In order to overcome this problem, the amplification circuit AMP, the A/D conversion circuit A/D and the integrator may be disposed for each photoreceptive element PD, without employing the switches SW as shown in FIG. 11B. Thus, the integration of the light reception signals output from the respective photoreceptive elements PD can be performed in parallel, and the early degradation of the laser diode can be inhibited. However, the circuit structure becomes large in scale because the A/D conversion circuit A/D and the integrator have to be disposed for each photoreceptive element PD.

SUMMARY OF THE INVENTION

It is therefore an object of the present invention to provide a vehicular radar system capable of performing integration of light reception signals output from multiple photoreceptive elements in parallel by using a small-scale circuit structure.

According to an aspect of the present invention, a radar system of a vehicle has a light emitter, a photoreceptor, a comparator, an integrator, and a sensor. The light emitter repeatedly emits laser light so that the laser light is emitted over a predetermined angular range at least along width direction of the vehicle in each light emission. The photoreceptor outputs light reception signals, which are output from photoreceptive elements in accordance with intensity of reflected laser light reflected by a reflection object. The photoreceptive elements are arranged at least along the width direction of the vehicle. The comparator compares the light reception signal output from each photoreceptive element with a standard signal and outputs for each photoreceptive element a comparison signal indicating two different states corresponding to a result of the comparison. The integrator samples the comparison signal and converts the comparison signal into one-bit digital data while a predetermined time passes after the laser light is emitted. The integrator integrates the digital data for each photoreceptive element based on emitting timing of the laser light every time the laser light is emitted. The integrator outputs the integrated data. The sensor compares the integrated data of each photoreceptive element with a predetermined integration standard value. The sensor senses the reflection object based on the integrated data equal to or greater than the integration standard value.

The radar system of the present invention can be structured with one signal line for each channel unlike a conventional radar system that uses an eight-bit A/D converter requiring eight signal lines for each channel. The integrator integrates one-bit digital data for each channel. A counter can substitute for the integrator. Thus, the light reception signals output from the multiple photoreceptive elements can be integrated in parallel by using a small-scale circuit structure having the comparator and the integrator.

Since the integrator integrates the light reception signals for each channel, the detection sensitivity of the reflected light can be improved.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
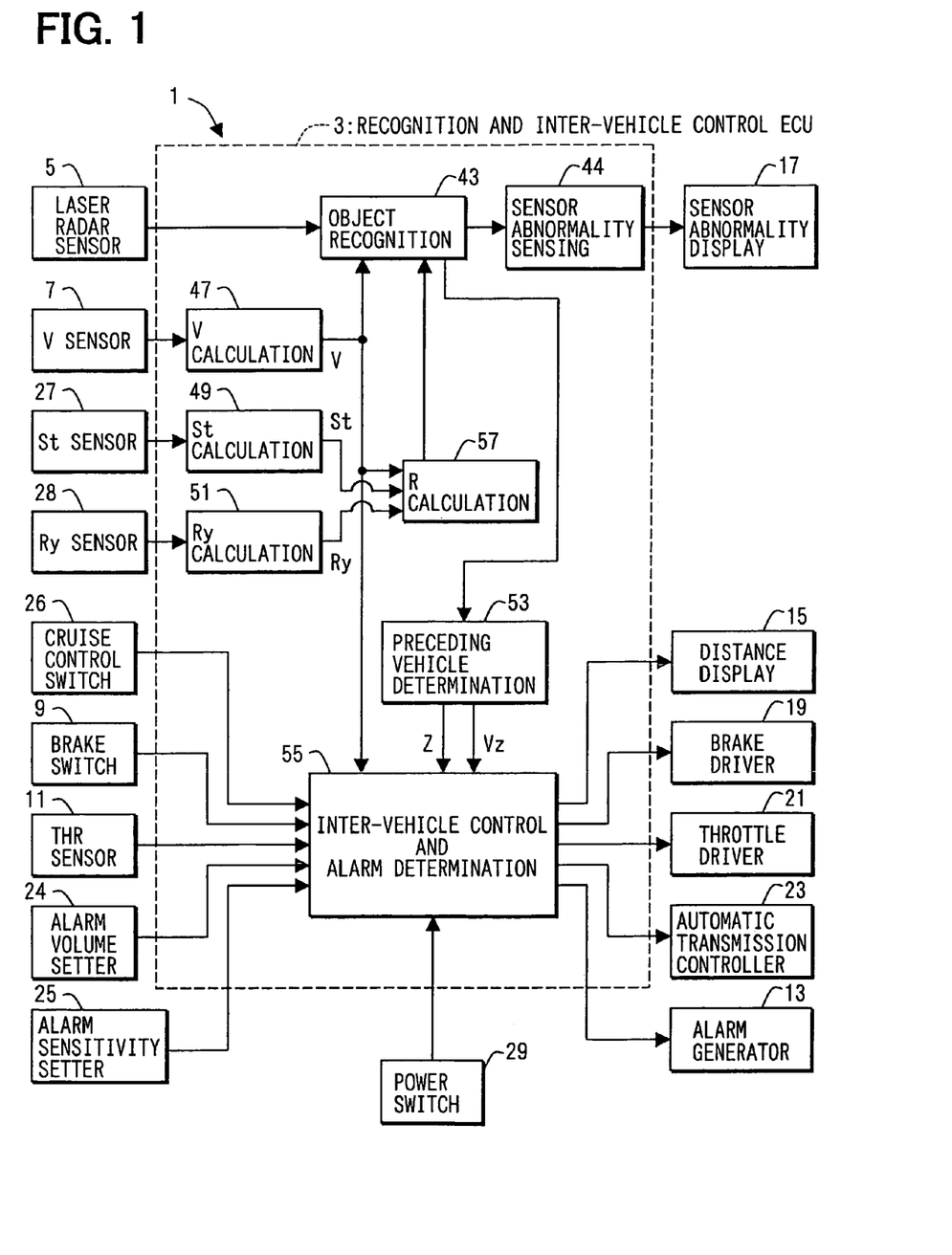
FIG. 1 is a block diagram showing a vehicle controller according to an example embodiment of the present invention.

Referring to FIG. 1, a vehicle controller 1 according to an example embodiment of the present invention is illustrated. The vehicle controller 1 is structured centering on a recognition and inter-vehicle control electronic control unit (ECU) 3. The ECU 3 includes a microcomputer, an input/output interface (I/O) and various drive circuits and detection circuits.

The ECU 3 receives detection signals from a laser radar sensor 5 as a vehicular radar system, a vehicle speed sensor 7, a brake switch 9, and a throttle opening degree sensor 11. The ECU 3 outputs drive signals to an alarm generator 13, a distance display 15, a sensor abnormality display 17, a brake driver 19, a throttle driver 21 and an automatic transmission controller 23.

The ECU 3 is connected with an alarm volume setter 24 for setting the volume of the alarm, an alarm sensitivity setter 25 for setting sensitivity of alarm determination processing, a cruise control switch 26, a steering sensor 27 for sensing a manipulation amount St of a steering wheel (not shown), and a yaw rate sensor 28 for sensing a yaw rate Ry caused in the vehicle. The ECU 3 has a power switch 29. If the power switch 29 is switched on, the ECU 3 starts predetermined processing.

Figure 2:
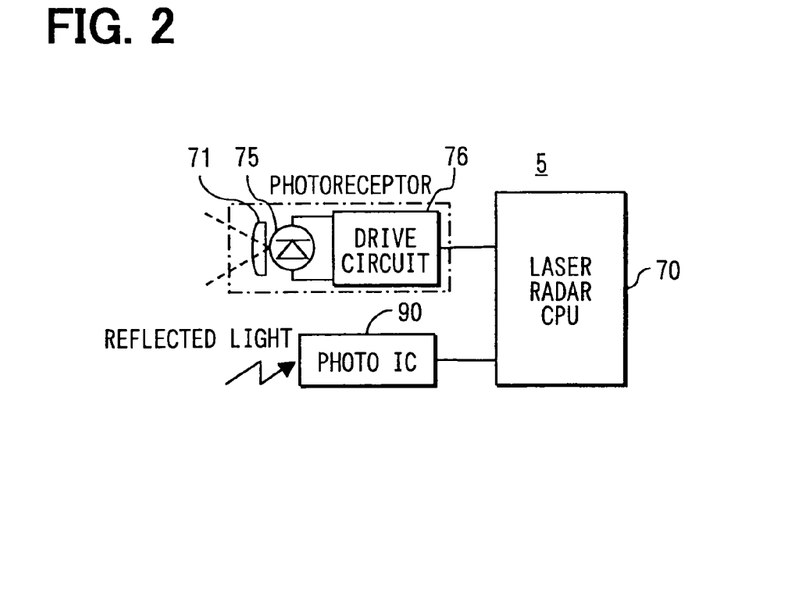
FIG. 2 is a schematic diagram showing a laser radar sensor according to FIG. 1 embodiment.

As shown in FIG. 2, the laser radar sensor 5 has a light emitter, a photo integrated circuit (photo IC) 90 including a photoreceptor, a laser radar CPU 70 and the like. The light emitter has a semiconductor laser diode 75 for emitting a pulse-shaped laser light through a light emission lens 71. The laser diode 75 is connected with the CPU 70 through a laser diode drive circuit 76, and emits the laser light responsive to a drive signal output by the CPU 70.

If a light-emitting direction of the light emitter is regarded as a virtual z-axis, the light emitter can emit the laser light over a predetermined area defined by predetermined angles along a virtual x-axis, i.e., a width direction of the vehicle perpendicular to the z-axis, and along a virtual y-axis, i.e., a height direction of the vehicle perpendicular to the z-axis, in one light emission. The light emitter emits the laser light repeatedly and intermittently. The light emitter does not scan the x-y plane defined by the x-axis and y-axis.

If the laser light is emitted over the predetermined area defined by the predetermined angles, the laser light is reflected by a reflection object, and the photoreceptor of the photo IC 90 receives the reflected light. Based on a light reception signal corresponding to the received light, the CPU 70 obtains reflection angles $\theta x$, $\theta y$ (lateral angle $\theta x$ and vertical angle $\theta y$) of the reflection object and a distance L from the reflection object. In this example embodiment, the lateral angle $\theta x$ is defined as an angle provided between the z-axis and a line produced by projecting the reflected light onto the x-z plane, and the vertical angle $\theta y$ is defined as an angle provided between the z-axis and a line produced by projecting the reflected light onto the y-z plane.

Figure 3:
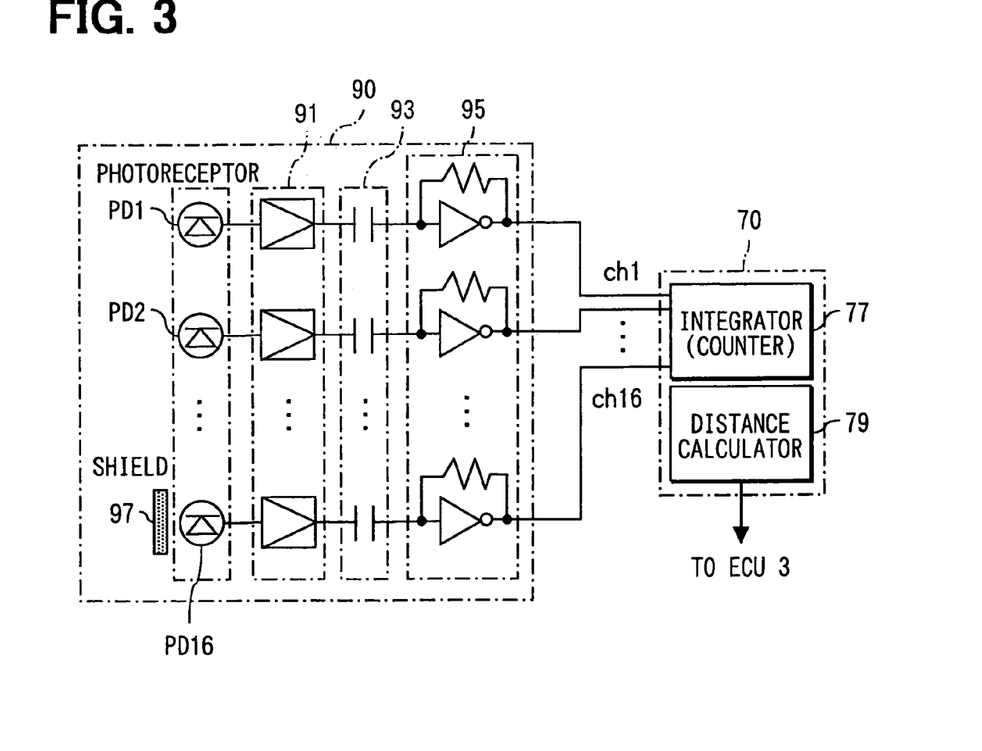
FIG. 3 is a schematic diagram showing a photo IC of the laser radar sensor and a laser radar CPU according to FIG. 1 embodiment.

As shown in FIG. 3, the laser radar sensor 5 of this example embodiment has a zero-cross comparator 95, instead of the A/D conversion circuit shown in FIG. 11B. The zero-cross comparator 95 outputs a comparison signal indicating two different states for each photoreceptive element PD (for each channel). Conventionally, in the case where an eight-bit A/D conversion circuit is used, eight signal lines were necessary for each channel. In contrast, in this example embodiment, only one signal line is necessary for each channel.

The laser radar sensor 5 of this example embodiment has an integrator 77 shown in FIG. 3, instead of the integrators shown in FIG. 11B. The integrator 77 shown in FIG. 3 integrates sampled one-bit digital data for each channel. A counter can be used in place of the integrator 77 since the integrator 77 integrates the one-bit digital data.

Thus, the laser radar sensor 5 has the zero-cross comparator 95, which outputs the comparison signal indicating two difference states for each channel, and the integrator 77, which integrates the sampled one-bit data for each channel. Therefore, the laser radar sensor 5 can be structured small in size, and the integration of the light reception signals output from the multiple photoreceptive elements can be performed in parallel.

The integrator 77 integrates the light reception signals output from the photoreceptive elements for each channel to improve the detection sensitivity of the reflected light.

The photo IC 90 is structured by an IC as shown in FIG. 3. The photo IC 90 has a photo reception lens for converging the reflected laser light (reflected light) reflected by a reflection object, a photoreceptor that outputs voltages (light reception signals) corresponding to intensity of the reflected light that is converged, amplifiers 91, coupling capacitors 93, and the zero-cross comparators 95.

The number (16, in this example embodiment) of the photoreceptive elements PD1-PD16 is set in accordance with angular resolution to be ensured. The photoreceptive elements PD1-PD16 are arranged in parallel into an array along the width direction (x-axis) of the vehicle. The photoreceptive elements PD1-PD16 output light reception signals corresponding to intensity of the laser light reflected by the reflection object. In addition to the photoreceptive elements PD1-PD16 arranged into the array along the width direction of the vehicle, another sixteen photoreceptive elements (not shown) are arranged in multiple rows along the y-axis perpendicular to the width direction of the vehicle. Thus, three-dimensional measurement can be performed.

The photoreceptor has the light shield 97 shielding at least one photoreceptive element (for example, the photoreceptive element PD16) from the light. Thus, a base noise component superimposed on the light reception signals of the photoreceptive elements PD1-PD15, which are not shielded by the light shield 97, can be eliminated based on the light reception signal output from the photoreceptive element PD16, which is shielded by the light shield 97.

Figure 7:
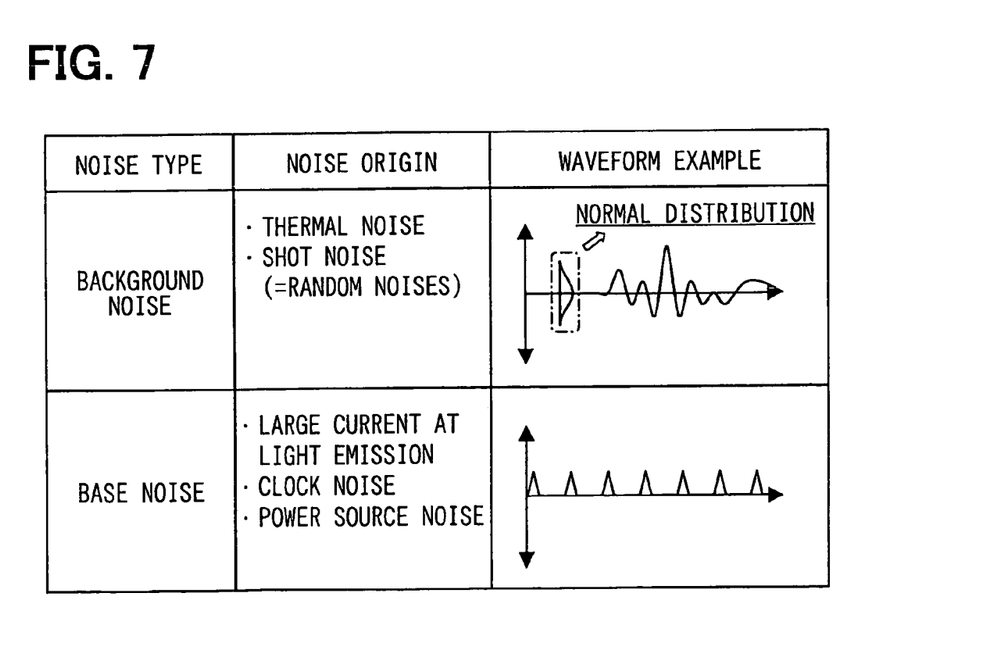
FIG. 7 is a table showing types, origins and waveforms of noises.

The base noise and a background noise are superimposed on the light reception signals of the photoreceptive elements. As shown in FIG. 7, the base noise is a noise generated by a large current when the light emitter generates the laser light, a clock noise generated in synchronization with a clock cycle of the CPU, or a power source noise generated by a power source. These noises are generated at predetermined intervals.

In this example embodiment, as shown in FIG. 3, the light shield 97 (for example, aluminum foil) shields the photoreceptive element PD16 from the light. Thus, only the base noise, from which the back ground noise is eliminated, is superimposed on the integration data that corresponds to the light reception signal output from the photoreceptive element PD16 and that is integrated by the integrator 77. Therefore, by using the integration data of the photoreceptive signal from the photoreceptive element PD16, the base noise superimposed on the other photoreceptive elements PD1-PD15 can be eliminated.

The base noise may be eliminated in the CPU 70 by subtracting the integration data of the shielded channel from the integration data of the channel that is not shielded.

A subtracter may be provided for each channel between the coupling capacitor 93 and the zero-cross comparator 95 in the photo IC 90, and the base noise may be eliminated by subtracting the light reception signal of the shielded channel from the light reception signal of each channel.

The amplifier 91 is provided for each channel for amplifying the light reception signal at a predetermined ratio. The amplified light reception signal is output to the coupling capacitor 93 provided for each channel. The coupling capacitor 93 eliminates a direct current component superimposed on the light reception signal (for example, component corresponding to solar light constantly superimposed on the light reception signal).

The zero-cross comparator 95 is structured by a resistor and an inverter. The zero-cross comparator 95 is provided for each channel. The light reception signal of each channel, from which the direct current component is eliminated, is input into the zero-cross comparator 95 and compared with a predetermined standard signal (0V signal, in this instance).

The zero-cross comparator 95 outputs a comparison signal indicating one of the two different states corresponding to the comparison result for each channel. If the light reception signal is higher than the standard signal, the zero-cross comparator 95 outputs a signal of voltage level corresponding to HIGH. If the light reception signal is lower than the standard signal, the zero-cross comparator 95 outputs a signal of voltage level corresponding to LOW.

Thus, the photo IC 90 has the photoreceptor, the amplifier 91, the coupling capacitor 93 and the zero-cross comparator 95 for each channel. Therefore, a series of processes from generating the comparison signals based on the light reception signals output from the photoreceptor to outputting the comparison signals is performed in parallel throughout the channels.

Figure 4:
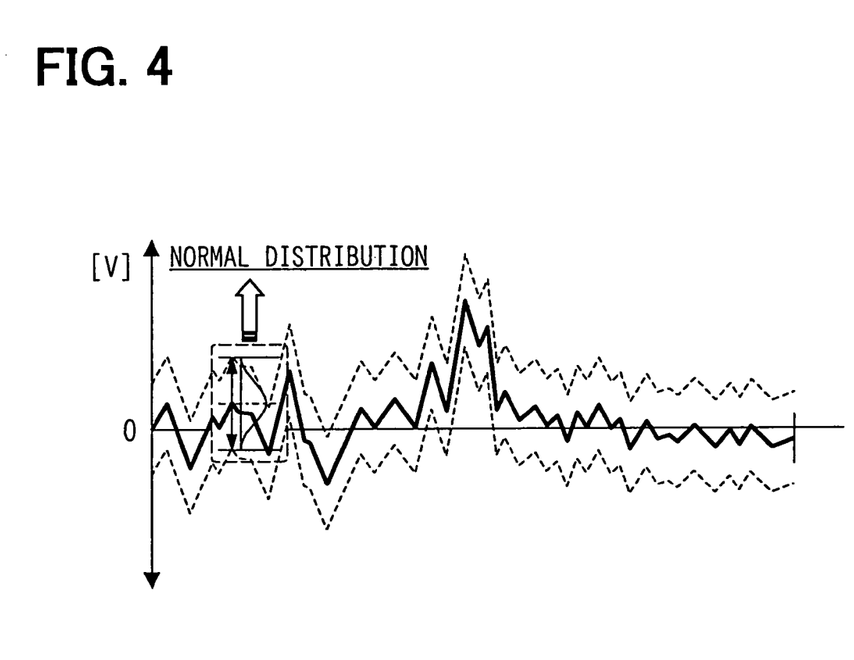
FIG. 4 is a graph showing a waveform of a light reception signal.

A light reception signal, from which the direct-current component is eliminated and which is input into the zero-cross comparator 95, is shown in FIG. 4. Generally, a background noise is superimposed on the light reception signal. As shown in FIG. 7, the background noise is a thermal noise (Johnson noise) caused by a resistor or a shot noise caused by a semiconductor. These noises are random noises irrelevant to frequency. Therefore, as shown in FIG. 4, a frequency distribution of the light reception signals superimposed with the background noise becomes a substantially normal distribution.

The integrator 77 shown in FIG. 3 indicates a function of the CPU 70 structured as a microcomputer. The integrator 77 samples the comparison signal, which is output by the photo IC 90 for each channel while a predetermined time elapses after the light emitter emits the laser light, at a predetermined sampling time interval.

The integrator 77 starts sampling based on light emitting timing as a standard (trigger). The sampled comparison signal is converted into one-bit digital data, in which HIGH is associated with 1 and LOW is associated with 0. The one-bit digital data is stored for each channel as chronological digital data associated with the elapsed time after the laser light emission timing, in an inner memory inside the CPU 70.

Every time the laser light is emitted, the integrator 77 performs the above-explained sampling, and integrates the currently obtained chronological digital data and the already stored chronological data for each channel. In this integration, the digital data at the time when the same time elapses after the emission timing of the laser light are integrated with each other.

Figure 5A:
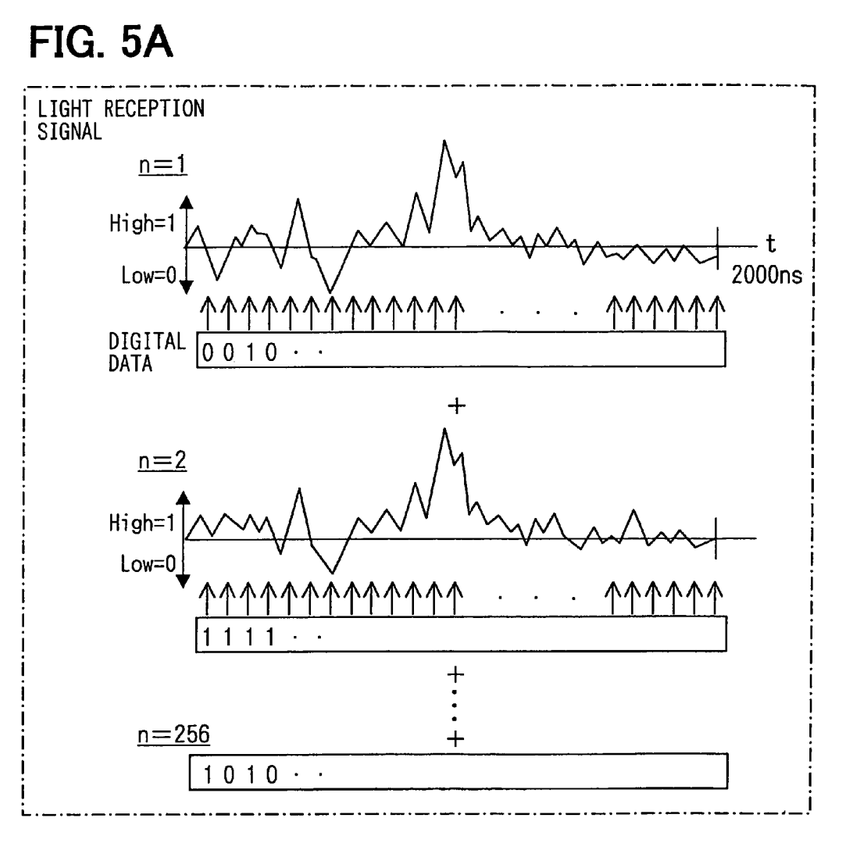
FIGS. 5A and 5B are graphs showing integration processing performed by the CPU according to FIG. 1 embodiment.
Figure 5B:
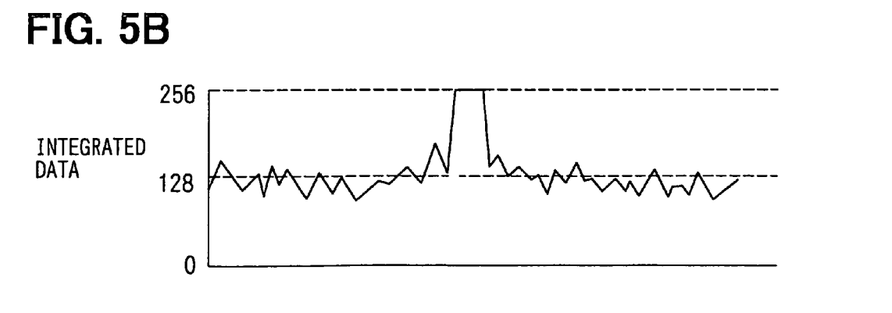

The contents of the integration processing performed by the integrator 77 is shown in FIG. 5A and FIG. 5B. As shown in FIG. 5A, the integrator 77 samples the comparison signals of each channel output from the zero-cross comparator 95 at a predetermined sampling time interval (for example, 10 nsec) while a predetermined time (for example, 2000 nsec) elapses after the laser light is emitted. The integrator 77 converts the sampled comparison signals into the chronological digital data, which are stored in the inner memory of the CPU 70, for each channel in the first run (n=1).

If the laser light is emitted next time (n=2), the integrator 77 samples the comparison signal output from the zero-cross comparator 95, and integrates the digital data sampled and stored in the first run (n=1) and the digital data sampled in the second run (n=2) for each channel.

Then, until the laser light is emitted predetermined times (256 times, for example), the above-explained integration processing is repeatedly performed for the number of times the laser light is emitted. The final integration data of each channel are output to a distance calculator 79.

By integrating the chronological digital data, the light reception signal component corresponding to the reflected light reflected by the reflection object is amplified to improve the detection sensitivity of the reflection light. Namely, in the case where the light reception signal components corresponding to the reflected light reflected by the reflection object are included in all the 256 light reception signals, the comparison signals corresponding to the light reception signal components appear at the timing, which is later than the emission timing of the laser by the same time length. Therefore, the integration value of the light reception signal component corresponding to the reflected light reflected by the reflection object coincides with the light reception signal component of each light reception signal amplified by 256 times.

The background noise having a substantially normal distribution is superimposed on the light reception signal as shown in FIG. 4. The integration value of the back ground noise component coincides with the background noise component amplified by just sixteen ($\sqrt{(256)}$) times.

Since the integrator 77 performs the integration processing, the light reception signal component corresponding to the reflected lights reflected by the reflection objects are amplified by the time of the integration. As a result, an S/N ratio (signal-to-noise ratio) is improved, and the detection sensitivity of the reflected light can be improved.

The distance calculator 79 shown in FIG. 3 compares the integration data of each channel having the improved S/N ratio with a predetermined integration standard value. The reflection object can be detected based on the integration data, which is equal to or greater than the integration standard value.

The CPU 70 senses the lateral angle $\theta x$ and the vertical angle $\theta y$ based on the position of the photoreceptive element outputting a voltage signal equal to or greater than an integration standard value (standard voltage). In an example shown in FIG. 6A, the photoreceptor (photoreceptive elements PD1-PD16) receives the reflected light reflected by the reflection object straight in front of the vehicle. The reflected light received by the light reception lens 80 is converged at the photoreceptive element at a position corresponding to an angle (direction) of the reflection object. Therefore, the lateral angle (direction) $\theta x$ of the reflection object can be sensed based on the position of the photoreceptive element outputting the integration signal equal to or greater than the standard voltage.

Figure 6A:
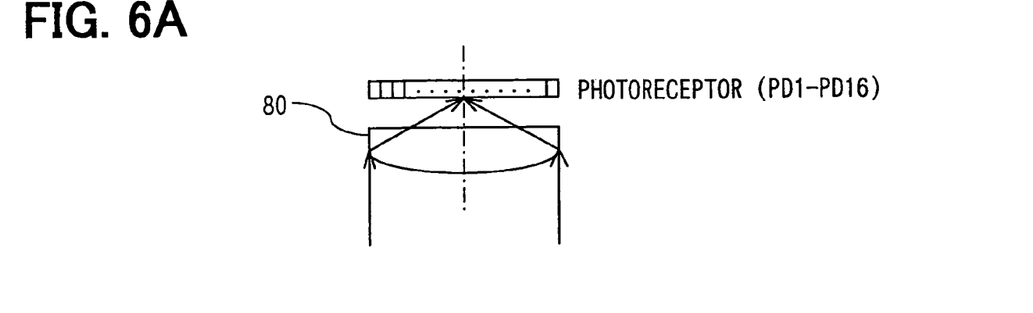
FIGS. 6A and 6B are schematic diagrams showing photoreceptive elements and a light reception lens according to FIG. 1 embodiment.

The position of the photoreceptive element differs in accordance with the height of the reflection object. Therefore, the vertical angle $\theta y$ of the reflection object can be sensed based on the position of the photoreceptive element outputting the integration signal equal to or greater than the standard voltage.

Figure 6B:
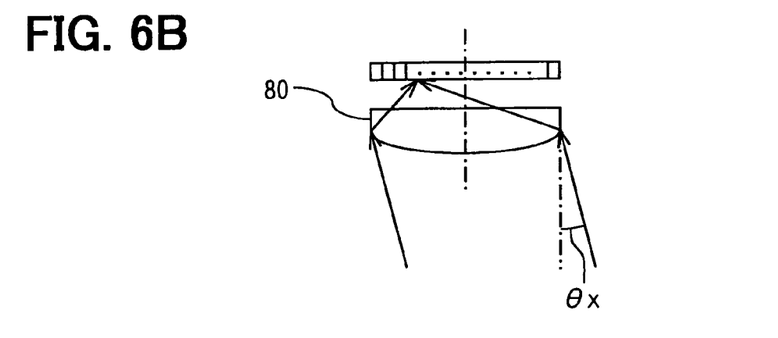

Therefore, the number of the photoreceptive elements should be preferably set in accordance with the angular resolution of the angle along the width direction or the height direction of the vehicle to be sensed. For example, as shown in FIG. 6B, the lateral angle $\theta x$ of the reflection object can be sensed based on the position where the reflected light is converged. Therefore, by setting the number of the photoreceptive elements in accordance with the angular resolution of the angle along the width direction of the vehicle, the angle of the reflection object along the width direction of the vehicle can be obtained precisely. The similar explanation also applies to the vertical angle $\theta y$.

Figure 8:
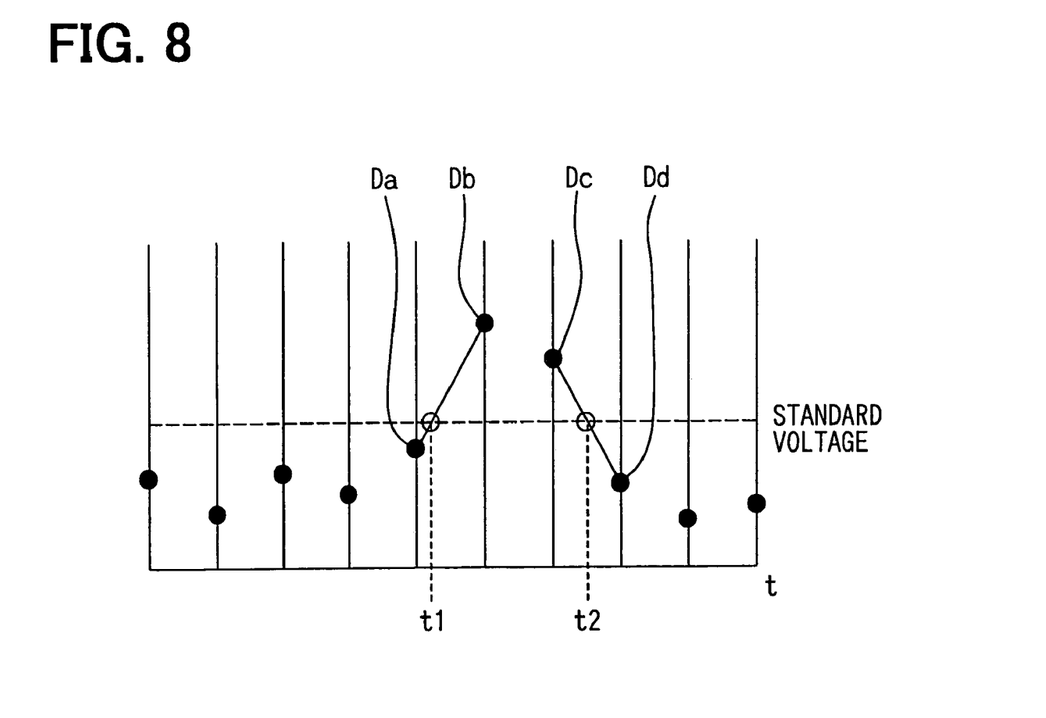
FIG. 8 is a diagram showing linear interpolation processing according to FIG. 1 embodiment.

The distance calculator 79 compares the integration data of each channel with the predetermined integration standard value. The reflection object is detected based on the integration data, which is equal to or greater than the integration standard value. For example, as shown in FIG. 8, the integration value of the sporadic integration data stored in the integrator 77 for each channel is compared with the integration standard value. At that time, if the integration values Db, Dc are greater than the integration standard value as shown in FIG. 8, the result of the comparison is output to an interpolation device (not shown).

The interpolation device performs linear interpolation to obtain rising time t1 and dropping time t2, at which it is presumed that the integration value (value of integration signal) crosses the standard voltage. More specifically, an imaginary line running on the integration value Db exceeding the standard voltage and on another integration value Da obtained immediately before the integration value Db is imagined. Then, time corresponding to an intersection of the imaginary line and the standard voltage is obtained as the rising time t1. Likewise, another imaginary line running on the integration value Dc exceeding the standard voltage and yet another integration value Dd obtained immediately after the integration value Dc is imagined. Then, time corresponding to an intersection of the imaginary line and the standard voltage is obtained as the dropping time t2.

The CPU 70 calculates time when a peak value of the light reception signal component S is generated based on the rising time t1 and the dropping time t2. Then, the CPU 70 calculates a time difference $\Delta t$ between the time when the laser light is emitted and the time when the peak value is generated.

The CPU 70 calculates the distance from the reflection object based on the time difference $\Delta t$. The CPU 70 makes positional data based on the distance and the lateral angle $\theta x$ and the vertical angle $\theta y$ of the reflection object. For example, the positional data of the reflection object on an x-y-z orthogonal coordinate system are obtained based on the distance, the lateral angle $\theta x$ and the vertical angle $\theta y$. The origin of the x-y-z orthogonal coordinate system coincides with the center of the laser radar sensor 5, the x-axis coincides with the width direction of the vehicle, and the y-axis coincides with the height direction of the vehicle. Then, the positional data are output to the ECU 3 as distance surveying data.

The ECU 3 recognizes the object based on the distance surveying data provided by the laser radar sensor 5. The ECU 3 performs inter-vehicle control for controlling the vehicle speed V by outputting drive signals to the brake driver 19, the throttle driver 21 and the automatic transmission controller 23 in accordance with conditions of a preceding vehicle obtained from the recognized object. The ECU 3 simultaneously performs alarm determination processing for providing an alarm when the recognized object exists within a predetermined alarm area for a predetermined time. The object is a vehicle running ahead or a vehicle stopping ahead.

The distance surveying data output from the laser radar sensor 5 is transmitted to an object recognition block 43. The object recognition block 43 obtains the central position (X, Y, Z) and the dimensions (W, D, H), i.e., the width W, the depth D and the height H, of the object based on the three-dimensional positional data obtained as the distance surveying data.

The object recognition block 43 calculates relative speed (Vx, Vy, Vz) of the object on the basis of the position of the own vehicle, in which the laser radar sensor 5 is mounted, based on a temporal change of the central position (X, Y, Z). The object recognition block 43 recognizes whether the object is a stationary object or a moving object based on the vehicle speed (own vehicle speed) V, which is output by a vehicle speed calculation block 47 based on the sensing value of the vehicle speed sensor 7, and the relative speed (Vx, Vy, Vz). The object that can affect the travel of the own vehicle is selected based on the recognition result and the central position of the object, and the distance to the object is displayed on the distance display 15.

A steering angle calculation block 49 calculates the steering angle St based on the signal output from the steering sensor 27. A yaw rate calculation block 51 calculates the yaw rate Ry based on the signal output from the yaw rate sensor 28. A curvature radius calculation block 57 calculates a curvature radius R based on the vehicle speed V output by the vehicle speed calculation block 47, the steering angle St output by the steering angle calculation block 49 and the yaw rate Ry output by the yaw rate calculation block 51.

The object recognition block 43 determines a possibility that the object is a vehicle or a possibility that the vehicle as the object is running on the same lane as the lane on which the own vehicle is running based on the curvature radius R, the central position coordinates (X, Z) and the like. A sensor abnormality sensing block 44 determines whether the data obtained by the object recognition block 43 are in an abnormal range. If the data are in the abnormal range, the sensor abnormality display 17 displays a notification of the abnormality.

A preceding vehicle determination block 53 selects a preceding vehicle based on various data obtained from the object recognition block 43 and calculates the distance Z along the z-axis and the relative speed Vz with respect to the preceding vehicle. In the alarm determination, an inter-vehicle control and alarm determination block 55 determines whether the alarm should be provided, based on the distance Z, the relative speed Vz, the setting of the cruise control switch 26, a pressed state of the brake switch 9, the opening degree THR of the throttle valve output by the throttle opening degree sensor 11 and the sensitivity setting value of the alarm sensitivity setter 25. If it is determined that the alarm is necessary, the inter-vehicle control and alarm determination block 55 outputs an alarm generation signal to the alarm generator 13. In cruise control determination, the inter-vehicle control and alarm determination block 55 determines the contents of the vehicle speed control, based on the distance Z, the relative speed Vz, the setting of the cruise control switch 26, the pressed state of the brake switch 9, the opening degree THR of the throttle valve output by the throttle opening degree sensor 11 and the sensitivity setting value of the alarm sensitivity setter 25. If the cruise control is determined, the inter-vehicle control and alarm determination block 55 outputs control signals to the automatic transmission controller 23, the brake driver 19 and the throttle driver 21 to perform necessary control. When these controls are performed, the distance display 15 displays necessary display signals to notify a vehicle driver of the conditions.

In this example embodiment, the zero-cross comparator 95 that outputs the comparison signal displaying the two different states for each channel is used in place of the conventional A/D conversion circuit. The integrator 77 for integrating the comparison signal output from the zero-cross comparator 95 is used in place of the conventional integration circuit.

In the case where the eight-bit A/D conversion circuit is conventionally used, eight signal lines are necessary for each channel. In contrast, only one signal line is necessary for each channel in this example embodiment. The counter can substitute for the integrator.

Thus, by using the zero-cross comparator 95 for outputting the comparison signal indicating the two different states for each channel and the integrator 77 for integrating the sampled one-bit digital data for each channel, the circuit structure can be reduced in scale, and the integration of the light reception signals output from the multiple photoreceptive elements can be performed in parallel.

Figure 9:
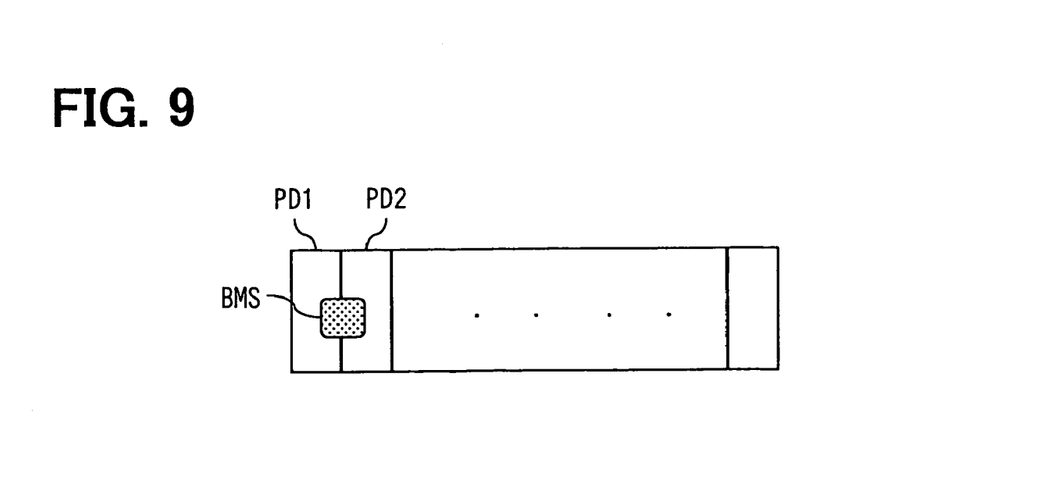
FIG. 9 is a schematic diagram showing the photoreceptive elements according to FIG. 1 embodiment.

The preceding vehicle may have a reflector having high reflection intensity with respect to the laser light on a rear side thereof. A body of the vehicle itself usually has relatively high reflection intensity. In the case where the preceding vehicle is the reflection object, there is a possibility that a reflected light (beam spot: BMS) having high reflection intensity is reflected by the reflector onto two photoreceptive elements (for example, the photoreceptive elements PD1, PD2) as shown in FIG. 9.

The integration signals corresponding to the electric charges provided by the photoreceptive elements PD1, PD2 are higher than the integration signals corresponding to the electric charges provided by the other photoreceptive elements. In such a case, the lateral angle θx of the preceding vehicle cannot be correctly sensed from the position of the photoreceptive elements where the reflected light is converged.

Figure 10:
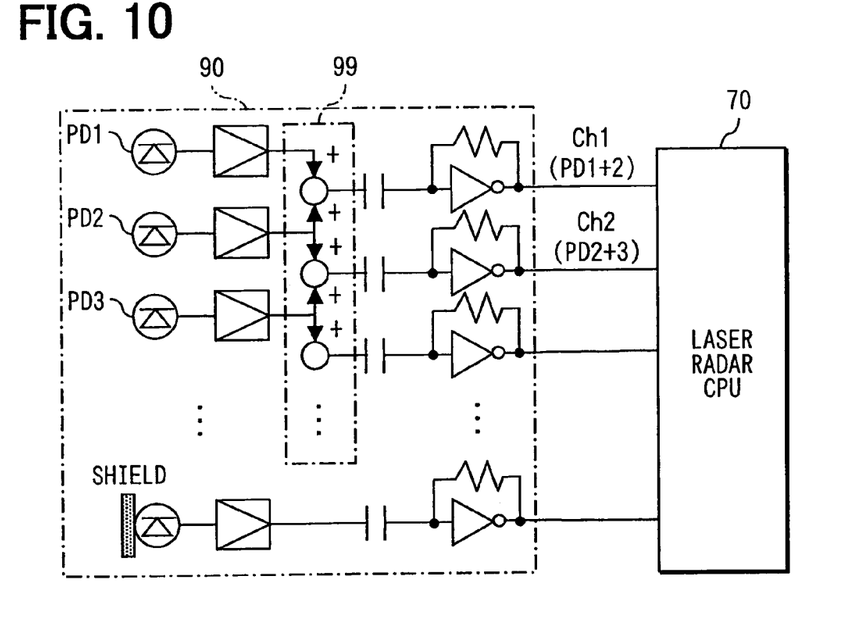
FIG. 10 is a schematic diagram showing a photo IC and a laser radar CPU according to a modified example embodiment of the present invention.

Therefore, as shown in FIG. 10, an adder 99 is provided for adding the light reception signals output from a predetermined number of (two) adjacent channels and for outputting the added signal. The zero-cross comparator 95 compares the added signal of each two channels output from the adder 99 through the coupling capacitor 93 with a predetermined standard signal. Then, the zero-cross comparator 95 outputs a comparison signal that indicates two different states corresponding to the comparison result for each two channels.

The CPU 70 samples the comparison signal of each two channels output from the zero-cross comparator 95 at a predetermined sampling time interval to convert the comparison signal into one-bit data. Every time the laser light is emitted, the CPU 70 integrates the digital data based on the emitting timing of the laser light for each two channels and outputs the integration data. The distance calculator 79 compares the integration data of each two channels output from the integrator 77 with a predetermined standard value to detect the reflection object.

Thus, by producing the integration data with the use of the added signal of each two channels output from the adder 99, the lateral angle θx of the preceding vehicle can be detected correctly.

The present invention should not be limited to the disclosed embodiments, but may be implemented in many other ways without departing from the spirit of the invention.

What is claimed is:

1. A radar system of a vehicle, the radar system having a light emitter for repeatedly emitting laser light so that the laser light is emitted over a predetermined angular range at least along width direction of the vehicle in each light emission, a photoreceptor for outputting light reception signals, which are output from photoreceptive elements in accordance with intensity of reflected laser light reflected by a reflection object, the photoreceptive elements being arranged at least along the width direction of the vehicle, the radar system comprising:

a comparator for comparing the light reception signal output from each photoreceptive element with a predetermined standard signal and for outputting for each photoreceptive element a comparison signal indicating two different states corresponding to a result of the comparison;

an integrator for sampling the comparison signal of each photoreceptive element and for converting the comparison signal into one-bit digital data while a predetermined time passes after the laser light is emitted, wherein the integrator integrates the digital data for each photoreceptive element based on emitting timing of the laser light every time the laser light is emitted, and outputs the integrated data; and a sensor for comparing the integrated data of each photoreceptive element with a predetermined integration standard value and for sensing the reflection object based on the integrated data equal to or greater than the integration standard value.

2. The radar system as in claim 1, further comprising:

a light shield in the photoreceptor for shielding at least one of the photoreceptive elements from the light; and an eliminator for eliminating a base noise component superimposed on the light reception signal of the photoreceptive element, which is not shielded by the light shield, based on the light reception signal of the photoreceptive element shielded by the light shield.

3. The radar system as in claim 1, wherein the sensor senses a distance to the reflection object and an angle of the reflection object along the width direction of the vehicle, the sensor sensing the angle based on a position of the photoreceptive element corresponding to the integration signal equal to or greater than the integration standard value.

4. The radar system as in claim 3, wherein the number of the photoreceptive elements is set in accordance with necessary angular resolution of the angle along the width direction of the vehicle.

5. A radar system of a vehicle, the radar system having a light emitter for repeatedly emitting laser light so that the laser light is emitted over a predetermined angular range at least along width direction of the vehicle in each light emission, a photoreceptor for outputting light reception signals, which are output from photoreceptive elements in accordance with intensity of reflected laser light reflected by a reflection object, the photoreceptive elements being arranged at least along the width direction of the vehicle, the radar system comprising:

an adder for adding the light reception signals output from a predetermined number of the adjacent photoreceptive elements and for outputting the added signal;

a comparator for comparing the added signal with a predetermined standard signal and for outputting for each predetermined number of the photoreceptive elements a comparison signal indicating two different states corresponding to a result of the comparison;

an integrator for sampling the comparison signal and for converting the comparison signal into one-bit digital data, wherein the integrator integrates the digital data for each predetermined number of the photoreceptive elements based on the emitting timing of the laser light every time the laser light is emitted, and outputs the integrated data; and a sensor for comparing the integrated data of each predetermined number of the photoreceptive elements with a predetermined integration standard value and for sensing the reflection object based on the integrated data equal to or greater than the integration standard value.

6. The radar system as in claim 5, further comprising:

a light shield in the photoreceptor for shielding at least one of the photoreceptive elements from the light; and an eliminator for eliminating a base noise component superimposed on the light reception signal of the photoreceptive element, which is not shielded by the light shield, based on the light reception signal of the photoreceptive element shielded by the light shield.

7. The radar system as in claim 5, wherein the sensor senses a distance to the reflection object and an angle of the reflection object along the width direction of the vehicle, the sensor sensing the angle based on a position of the photoreceptive element corresponding to the integration signal equal to or greater than the integration standard value.

8. The radar system as in claim 7, wherein the number of the photoreceptive elements is set in accordance with necessary angular resolution of the angle along the width direction of the vehicle.

* * * * *